United States Patent
Cuthbertson et al.

(10) Patent No.: US 6,471,390 B1
(45) Date of Patent: Oct. 29, 2002

(54) APPARATUS FOR PNEUMATICALLY STIRRING A BEVERAGE

(76) Inventors: Robert Cuthbertson, 1848 Clarion Ave., Cincinnati, OH (US) 45207; Diane Cuthbertson, 1848 Clarion Ave., Cincinnati, OH (US) 45207

( * ) Notice: Subject to any disclaimer, the term of this patent is extended or adjusted under 35 U.S.C. 154(b) by 0 days.

(21) Appl. No.: 09/630,772

(22) Filed: Aug. 2, 2000

(51) Int. Cl.$^7$ ................................................ B01F 13/02
(52) U.S. Cl. ...................................... 366/101; 366/130
(58) Field of Search ................................ 366/101, 136, 366/137, 130, 129; 222/210, 196, 203, 468; 220/592.17, 592.16, 592.18, 62.18, 661, 600, 666, 676

(56) References Cited

U.S. PATENT DOCUMENTS

| 24,686 | A | * | 7/1859 | Wicks |
| 56,991 | A | * | 8/1866 | Robbins |
| 69,485 | A | * | 10/1867 | Robbins |
| 178,096 | A | * | 5/1876 | Ballou et al. |
| 479,318 | A | * | 7/1892 | Thiellesen |
| 644,131 | A | * | 2/1900 | Ertsman |
| 1,328,866 | A | * | 1/1920 | Yeatter |
| 1,373,244 | A | * | 3/1921 | Hernandez |
| 1,554,147 | A | * | 9/1925 | Wager |
| 3,105,619 | A | * | 10/1963 | Rohrmuller |
| 3,831,905 | A | * | 8/1974 | Htoo et al. |
| 3,877,614 | A | * | 4/1975 | Murphy |
| 3,987,938 | A | * | 10/1976 | Cooprider et al. |
| 4,383,622 | A | * | 5/1983 | Guth |
| 4,763,818 | A | * | 8/1988 | Stefano et al. |
| 4,966,300 | A | * | 10/1990 | Coonradt |
| 4,967,939 | A | * | 11/1990 | Taylor |
| D371,049 | S | | 6/1996 | Cuthbertson et al. |
| 5,961,004 | A | * | 10/1999 | DeMars |
| 5,964,379 | A | * | 10/1999 | DeMars |

* cited by examiner

Primary Examiner—Tony G. Soohoo
(74) Attorney, Agent, or Firm—Wood, Herron & Evans, LLP

(57) ABSTRACT

A container for pneumatically stirring a beverage. Current flow displaced from a flexible member, such as a depressible bulb, is regulated through an outlet optionally containing a one-way valve into an opening in a liquid receptacle. The resultant current flow in the receptacle initiates a stirring motion in the beverage. Air expelled from the depressible bulb may be replenished through an inlet in the bulb.

3 Claims, 4 Drawing Sheets

APPARATUS FOR PNEUMATICALLY STIRRING A BEVERAGE

FIELD OF THE INVENTION

The present invention relates generally to an apparatus for stirring beverages and, more particularly, to a beverage container operable to inject an airflow into the contents of a cup.

BACKGROUND OF THE INVENTION

Many beverages require stirring prior to drinking. Cream, powder and sugar additives are commonly mixed into favorite drinks. Stirring also enhances the aroma and flavor of some beverages, and facilitates cooling of hot drinks. Hurried lifestyles often dictate that such beverages be prepared in transit. Many commuters regard the time and handling requirements associated with stirring as an inconvenience. Accordingly, food service distributors provide plastic stirrers and lids to facilitate stirring, such as plastic straws, sticks and spoons. Cups incorporate removable lids and lid cut-outs to allow access to the beverage.

Despite such accommodations, however, stirring remains an awkward, tedious chore to many consumers. In a culture where convenience and efficiency are valued, coordinating a cup, additive, spoon and lid is undesirable. The impracticality of such an undertaking is further accentuated where a consumer must simultaneously contend with a briefcase, telephone or steering wheel. Consequently, spills are commonplace, and schedules, safety and human tolerances are strained and compromised in the process. Also, current stirring practices often result in undissolved additives and uneven temperature distributions.

Therefore, there is desire for an improved manner of stirring the contents of a beverage container.

SUMMARY OF THE INVENTION

The present invention addresses these and other problems associated with the prior art by providing a unique beverage container operable to stir a contained liquid. The beverage container includes a flexible member operable to expel current flow into a receptacle portion when pressed. The flexible member may form part of a handle portion connected to the receptacle portion, for example, a depressible bulb that has an outlet coupled to an opening at the base of the receptacle. When desired, one-way valve adjacent the receptacle opening may prevent current flow from entering into the flexible member outlet. Thus, applying a force to the flexible member forces the air content of the member through the outlet, optional one-way valve and receptacle opening. The resultant current flow from the receptacle opening initiates a stirring motion in the beverage. The flexible member farther utilizes an inlet operable to replenish the supply of air expelled into the receptacle. The inlet in the flexible member may further comprise a removable cap to facilitate cleaning of the flexible member.

Thus, the present invention allows a beverage consumer to efficiently and conveniently stir their drink by pressing the handle of their beverage container. No plastic stirrers are required to mix the contents of a drink. Further, the even, focused swirling motion actuated by the beverage container results in more effective dissolutions and temperature distributions.

In an alternative embodiment, the flexible member has first and second outlets coupled to respective openings in the receptacle portion, such as near the top and bottom of the receptacle. A two-position stop member is operable to either permit flow in and/or out of both outlets or prevent flow from one outlet and force it through the other outlet. Thus, full circulation through the flexible member may be achieved, or one-way flow, by operation of a stop member.

In yet another embodiment, the handle portion of the beverage container is detachable from the receptacle portion. An elongated outlet of the flexible member, such as a depressible bulb, may be inserted inside compatible cups. Current flow from the flexible member is channeled through the elongated outlet when the member is depressed. The optional one-way valve contained within the outlet of the flexible member prevents the flow of current from entering the flexible member.

Still another embodiment utilizes for the flexible member a depressible sleeve concentric around the receptacle portion. The depressible sleeve has an outlet that is coupled to an opening in the receptacle portion. When the sleeve is pressed, current flows from the depressible sleeve through the sleeve outlet, an optional one-way valve, and receptacle opening so as to initiate a stirring effect in the beverage. A sleeve inlet replenishes the air expelled out of the depressed sleeve. The depressible sleeve may be detachable and incorporate an elongated outlet. In addition to the benefits of the above embodiment, the depressible sleeve operates as a thermal insulator to help preserve the desired temperature of the drink.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF SPECIFIC EMBODIMENT

Figure 1:
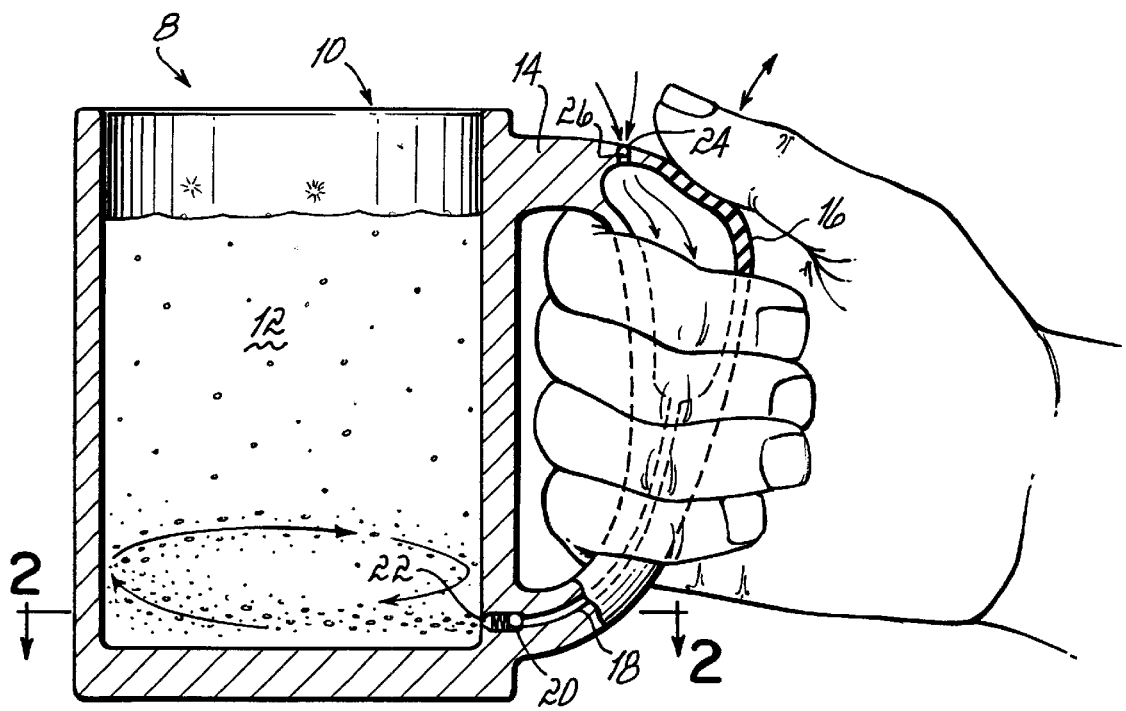
FIG. 1 is a cross-sectional view of a beverage container in accordance with the principles of the present invention.
Figure 2:
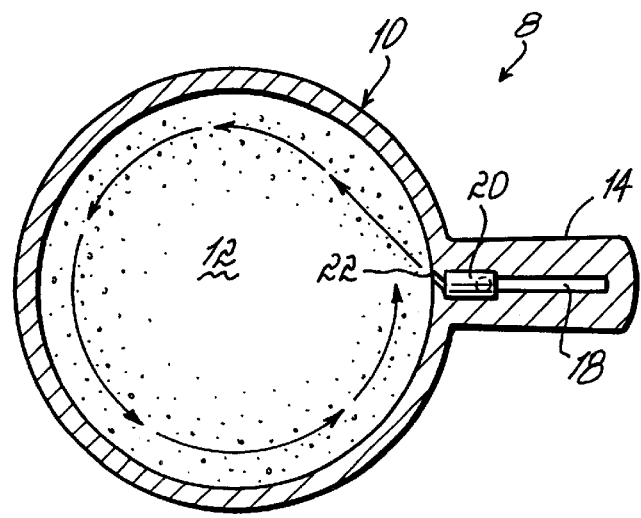
FIG. 2 illustrates a cross-sectional view taken in line 2—2 of the beverage container of FIG. 1.

Generally, the present invention relates to a container operable to pneumatically stir a beverage. The beverage container incorporates a receptacle portion of any material and shape suited for liquid containment. By way of example only, the receptacle portion may be a plastic cup, ceramic cup, glass, pitcher, thermos, or cooler. A flexible member, such as a depressible bulb or sleeve, is coupled to an opening in the receptacle portion and communicates a current flow into the opening when pressed. Referring to the Figures, in which like reference numerals are used to refer to like parts, one embodiment of a beverage container 8 is shown in FIGS. 1 and 2. An exemplary receptacle portion 10 is depicted containing a liquid 12. An attached handle portion 14 at least partially constructed of pliable material such as plastic, rubber, or wax-coated paper is integral with the receptacle portion 10 and comprises a depressible bulb 16 and outlet 18. The shape of the handle portion 14 is contoured so that it can be gripped between palm and fingers. It is to be understood that the handle portion, while illustrated attached to a side of the receptacle portion may be attached and/or extend above the receptacle portion, such as with a thermos or cooler.

The depressible bulb 16 is configured towards the top of the handle portion 14 and is receptive to presses from the thumb. The depression of the bulb 16 displaces air from the bulb into an optional one-way ball valve 20 of the outlet 18. The valve 20 is positioned adjacent an opening 22 in the receptacle portion 10. An exemplary ball valve is depicted in the Figure, however any known valve, such as a flapper valve may accordingly be substituted. The one-way valve 20 prevents current flow from entering the outlet 18 of the bulb 16, while it regulates current flow into the opening 22 in the receptacle portion 10. Alternatively, it may be desired to receive liquid 12 into the outlet 18 and consequently into the flexible member, which is then expelled by again pressing depressible bulb 16. This repeated displacement of a portion of liquid 12 enhances the stirring effect.

As illustrated further in FIG. 2, the receptacle opening 22 may be formed at an angle relative to the radius of the receptacle portion 10 to encourage a circulating current flow in the liquid 12. Further, the opening 22 may be positioned adjacent the bottom of the receptacle portion 10 to facilitate the dissolution of additives. The flow of current from the depressible bulb 16 into the receptacle portion 10 creates a low-pressure differential in the bulb 16. Either air enters the bulb 16 through an inlet 24, as shown in FIG. 1, until the pressure is equalized, or liquid 12 enters the bulb 16 through outlet 18. It may be appreciated that the inlet 24 could optionally comprise a one-way valve 26 operable to exclusively conduct air from inlet 24 into the depressible bulb 16, while preventing liquid from entering through outlet 18.

Figure 3:
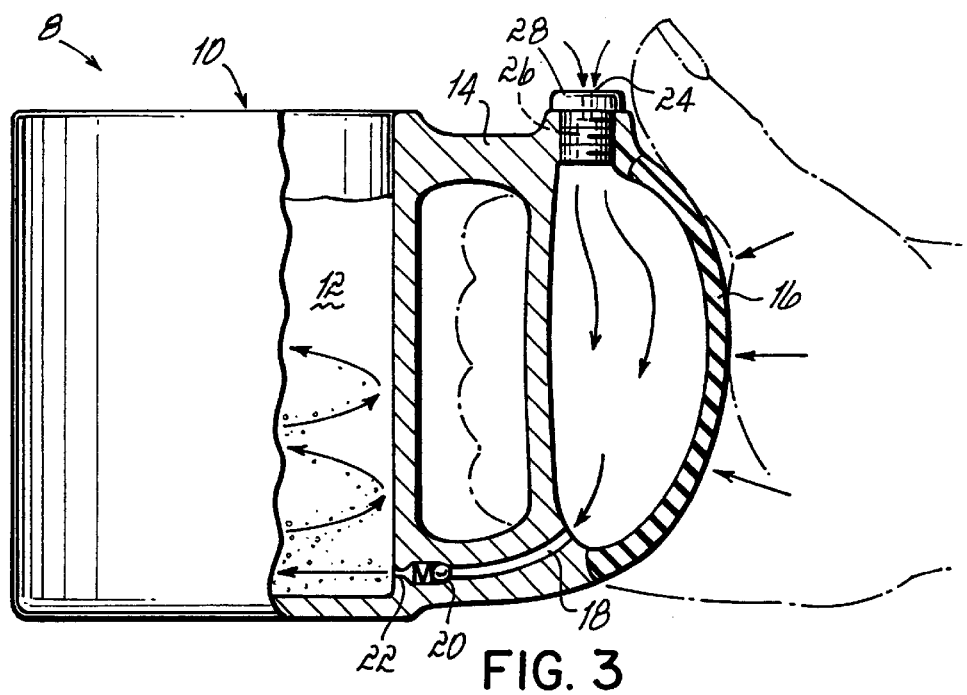
FIG. 3 is a partial cross-sectional view of a beverage container having a palm-actuated depressible bulb and a removable cap.

FIG. 3 illustrates a beverage container 8 similar to the above embodiment, but features an inlet 24 having a removable cap 28. The inlet 24 allows air to flow into the depressible bulb 16 when the removable cap 28 is in place. Again, inlet 24 may further include a one-way valve 26, as shown in phantom. When the cap 28 is removed, a user can clean and flush the interior of the depressible bulb 16. This is particularly advantageous where no one-way valve is used in the outlet 18 such that liquid 12 is allowed to enter the flexible member. Additionally, a fluid additive can be inserted into the bulb 16 through the open cap 28 to affect the taste, aroma or color of the liquid 12 in receptacle portion 10. The depressible bulb 16 of the handle portion 14 is oriented so as to be actuated by the fingers and palm of a gripping hand. A squeezing action compresses the depressible bulb 16. As above, the depression of the bulk 16 forces a current flow out of the bulb 16 and through the outlet 18 and optional valve 20. The current flow is directed through the opening 22 in the receptacle portion 10 and initiates a stirring action in the liquid 12. In each of these embodiments, the depression of the flexible member may also prove useful in the medical field, such as for patients having arthritis or hand injuries, as a therapeutic device to exercise the hand muscles.

In each of the above embodiments, the handle portion 14 may be formed integrally with the receptacle portion 10, or may be a removable component that snaps into the receptacle portion 10 or is otherwise attached so as to be removably integral with the receptacle portion 10.

Figure 4:
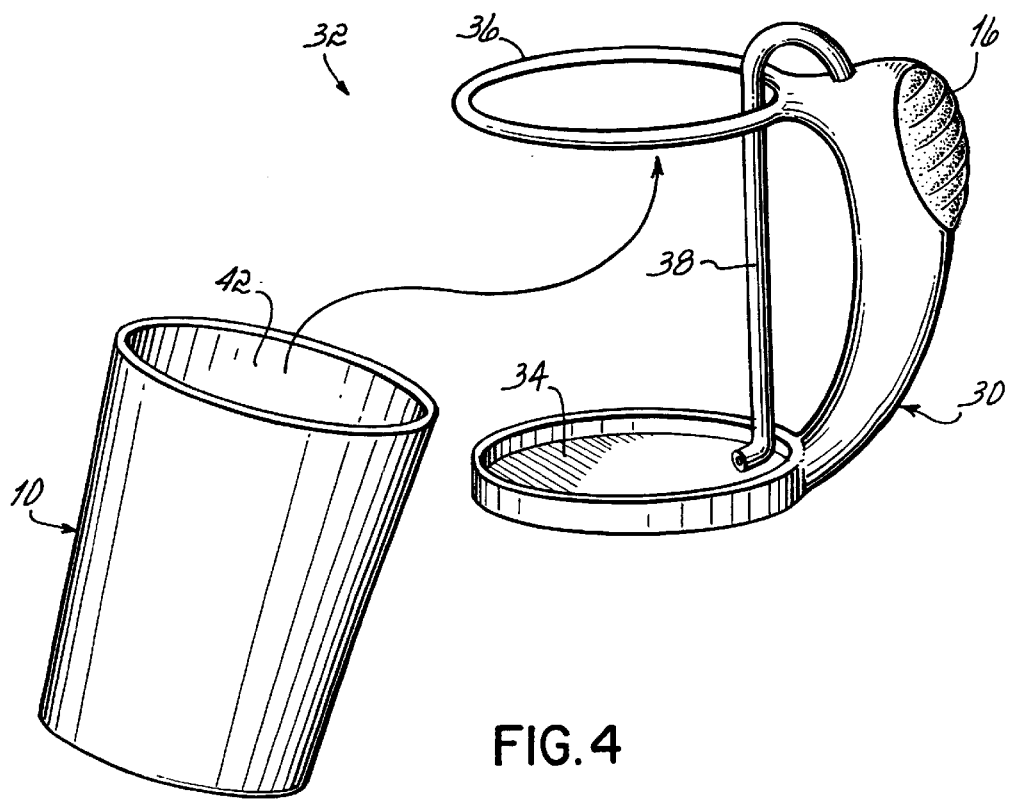
FIG. 4 illustrates a beverage container having a detachable handle portion that is in accordance with the principles of the present invention.

FIG. 4 illustrates an embodiment of a beverage container 32 of the present invention that incorporates a detachable handle portion 30. The detachable handle 30 may snap into a specially manufactured and mated receptacle portion (not shown), or may accommodate a receptacle portion 10 that is a conventional beverage cup as shown in the Figure. The attachment may be accomplished by clamps, hooks, support structures, or any suitable means of affixation. The detachable handle portion 30 of the illustrated beverage container 32 forms a base 34 and support ring 36. A receptacle portion is placed inside the ring support 36 and rests on the base 34.

The pneumatic operation of the handle portion 30 is unaffected by its detachable characteristics. However, the dimensions and position of the bulb outlet 38 may vary. For instance, where a handle portion is aligned with a receptacle portion such that the outlet of the depressible bulb mates directly with the receptacle opening, no substantial derivation from the above discussed outlet orientation is necessary. Such would be the case where a specially manufactured receptacle portion incorporates grooves that guide the attachment of the handle.

Where a conventional cup such as a tea cup or coffee mug is utilized as the receptacle portion 10, the open face of the conventional cup serves as the opening 42 of the receptacle portion 10. As such, it is necessary that the outlet 38 be long enough to be inserted inside the receptacle portion 10. The outlet 38 stems from the top of the handle portion 30 nearest the receptacle opening 42. The elongated outlet 38 communicates a current flow from the depressible bulb 16 to the beverage. As above, the outlet 38 may be constructed of either rigid or pliable material, depending on configuration requirements and desired visual effects.

Figure 5:
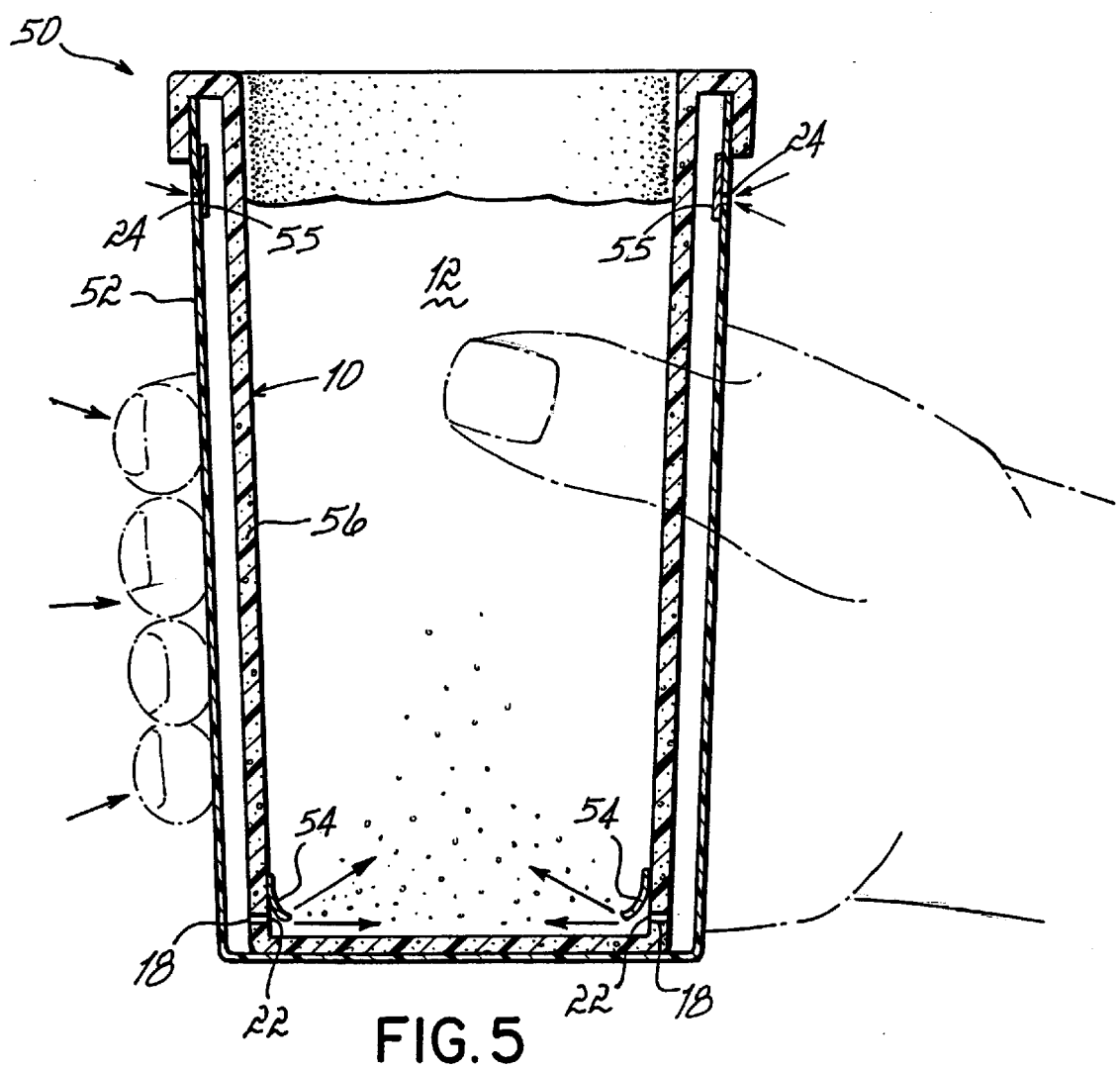
FIG. 5 is a cross-sectional view of a beverage container having a depressible sleeve in accordance with the present invention.

The beverage container 50 illustrated in FIG. 5 obviates the need for a handle portion for housing the flexible member. The shown container 50 instead relies on a depressible sleeve 52 to embody the principles of the present invention. The sleeve 52 may be manufactured from any known flexible material, including plastic, rubber or wax-coated paper. The depressible sleeve 52 is positioned concentrically around a receptacle portion 10. An outlet 18 of the depressible sleeve 52 is coupled to an opening 22 in the receptacle 10. When a force is applied to the depressible sleeve 52, the contents of the sleeve 52 are displaced through the outlet 18 into the receptacle opening 22. The current flow may be oriented by the outlet 18 or the opening 22 to create a swirling or stirring effect in the liquid 12 in the receptacle portion 10.

A one-way valve 54 of the sleeve outlet 18, such as a flapper valve, may optionally be placed adjacent the receptacle opening 22 to prevent current flow from entering the depressible sleeve 52. An inlet 24 of the depressible sleeve 52 receives air required to equalize the air pressure in the sleeve 52 with that of the atmosphere via flapper valve 55. As with the above embodiments that alternatively utilize a depressible bulb, the depressible sleeve configuration may incorporate features such as a removable cap and elongated outlet 18 to facilitate cleaning and interoperability with conventional drinking glasses. Additionally, insulative materials 56, such as foam, may be incorporated into the sleeve 52 for additional thermal benefit.

Figure 6:
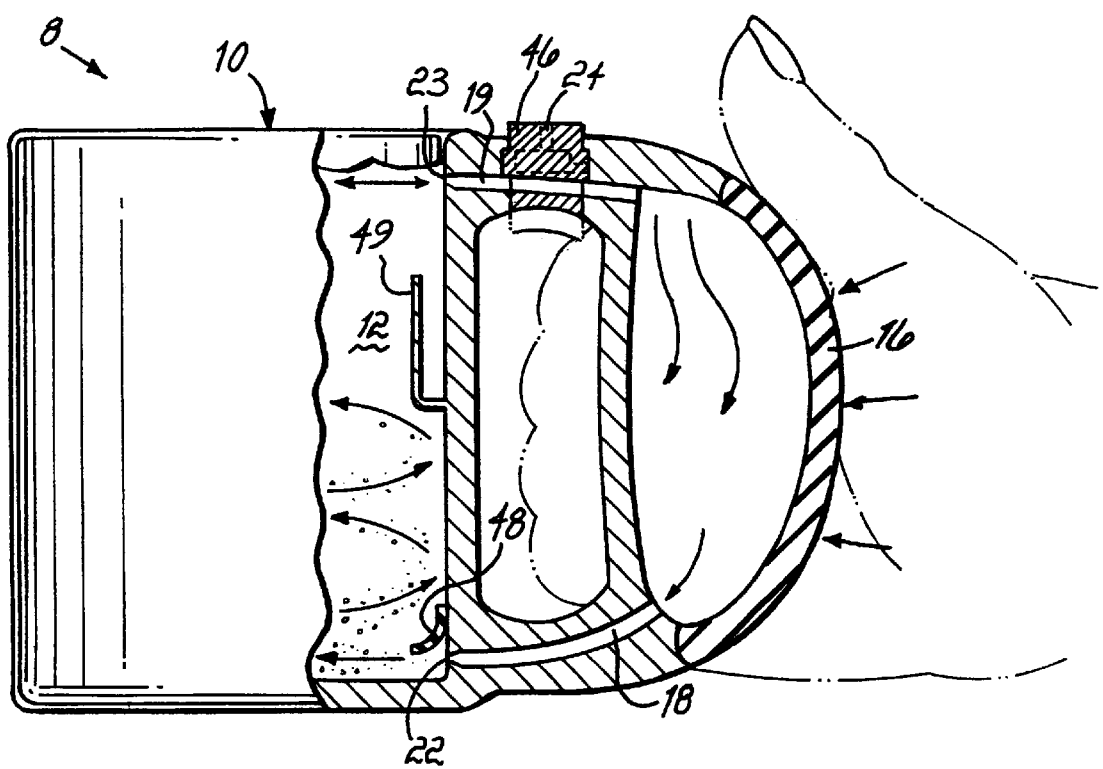
FIG. 6 is a partial cross-sectional view of a beverage container having a stop member and full circulation capability.

The beverage container 8 illustrated in FIG. 6 permits full circulation through the flexible member. In addition to the features of the embodiment of FIG. 1, container 8 further includes a second outlet 19 in handle portion 14 coupled to a second opening, 23 in receptacle portion 10. Again, handle portion 14 may be permanently integral or removably integral with receptacle portion 10. A two-position stop member 46 having inlet 24 is positioned so as to be operable with outlet 19 to either open the outlet 19 to current flow, or to close the outlet 19 to current flow. As depicted, when the stop member 46 is up, current flow may pass through opening 23, through outlet 19, into depressible bulb 16, out outlet 18 and through opening 22 into receptacle portion 10, or vice versa. A flapper valve 38, for example, may be positioned over opening 22 to prevent current flow into outlet 18 such that full circulation is achieved by pulling liquid into outlet 19 and out of outlet 18. Placement of a flapper valve (not shown) over outlet 19 instead would cause the circulation to occur in the opposite direction. Alternatively, without any valve mechanism, flow can both enter and exit both outlets 18 and 19 upon repeated operation of depressible bulb 16.

When the stop member 46 is down, as shown in phantom, outlet 19 is cut off such that only one-way flow out opening 22 is possible. Air is replenished into depressible bulb 16 by inlet 24 positioned in stop member 46. It is to be understood that alternative configurations for stop member 46 may be used to achieve the two positions for either full circulation or one-way flow, which alternatives are within the ordinary skill of one in the art. Beverage container 8 may further include a receiving member 49 on an inside surface of receptacle portion 10 for holding a tea bag or similar item.

While the present invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A beverage container comprising:
    a receptacle portion for containing liquid;
    a handle portion comprising a depressible bulb having an outlet at one end coupled to an opening in the receptacle portion, wherein air is forced into the receptacle portion through the opening to stir a liquid contained therein upon pressing the depressible bulb, wherein the depressible bulb has an inlet operable to receive current flow into the depressible bulb, and wherein the inlet further includes a removable cap for permitting access to the depressible bulb to flush the bulb.

2. A beverage container according to claim 1, wherein the opening in the receptacle portion is adjacent a bottom surface of the receptacle portion.

3. A beverage container comprising:
    a receptacle portion for containing liquid having an opening;
    a handle portion comprising an inlet, an outlet and depressible bulb coupled to the inlet and outlet, the outlet coupled to the opening in the receptacle portion, wherein the depressible bulb is operable to receive air from the inlet and expel air out the outlet to force the air through the opening in the receptacle portion to stir liquid contained therein, wherein the inlet further includes a removable cap for permitting access to the depressible bulb to flush the bulb; and
    a one-way valve positioned in the outlet of the handle portion operable to prevent liquid in the receptacle portion from being drawn into the depressible bulb.

* * * * *